(12) United States Patent
Heffernan et al.

(10) Patent No.: US 11,425,540 B2
(45) Date of Patent: Aug. 23, 2022

(54) PRIVATE VERTICAL COMMUNICATION PLATFORM

(71) Applicants: Jim Heffernan, Decatur, AL (US); Robert Sorrells, Arab, AL (US)

(72) Inventors: Jim Heffernan, Decatur, AL (US); Robert Sorrells, Arab, AL (US)

( * ) Notice: Subject to any disclaimer, the term of this patent is extended or adjusted under 35 U.S.C. 154(b) by 119 days.

(21) Appl. No.: 17/075,782

(22) Filed: Oct. 21, 2020

(65) Prior Publication Data

US 2021/0120379 A1 Apr. 22, 2021

Related U.S. Application Data

(60) Provisional application No. 62/924,211, filed on Oct. 22, 2019.

(51) Int. Cl.
*H04M 1/725* (2021.01)
*H04W 4/14* (2009.01)
*H04M 3/42* (2006.01)
*H04W 4/08* (2009.01)

(52) U.S. Cl.
CPC ......... *H04W 4/14* (2013.01); *H04M 3/42008* (2013.01); *H04W 4/08* (2013.01)

(58) Field of Classification Search
CPC ....... H04W 4/029; H04W 4/20; H04W 4/023; G01S 1/68; G08B 21/24
See application file for complete search history.

(56) References Cited

U.S. PATENT DOCUMENTS

| | | | |
|---|---|---|---|
| 2002/0187794 A1* | 12/2002 | Fostick | H04M 3/5322 455/466 |
| 2013/0218820 A1* | 8/2013 | Li | H04M 1/27457 706/20 |
| 2016/0360386 A1* | 12/2016 | Widebrant | H04W 4/14 |
| 2018/0205676 A1* | 7/2018 | Goyal | H04L 67/306 |
| 2019/0230221 A1* | 7/2019 | Archer | H04W 88/184 |

* cited by examiner

*Primary Examiner* — Amancio Gonzalez
(74) *Attorney, Agent, or Firm* — Jeremy A. Smith; Lanier Ford Shaver & Payne, PC

(57) ABSTRACT

The present disclosure provides a method of sending vertical SMS messages comprising a lead administrator contacting a first server with a request to create a group and providing certain identifying information to the first server; assigning an identification number to the group; creating and assigning at least one access code to the group; sharing the access code to desired members of the group and adding members to the group that send the access code to the identification number; and sending a SMS message to members of the group from the lead administrator, wherein the SMS messages are only shared vertically within the group.

11 Claims, No Drawings

PRIVATE VERTICAL COMMUNICATION PLATFORM

CROSS-REFERENCE TO RELATED APPLICATIONS

This application claims priority to, and the benefit of, U.S. Provisional Patent Application No. 62/924,211 filed on Oct. 22, 2019.

FIELD OF THE DISCLOSURE

The present disclosure pertains to the field of communications. More specifically, the present disclosure pertains a secure vertical communications platform using a short message service ("SMS").

BACKGROUND

Group messaging (such as Apple® iMessage®) have become common place in today's world. In addition to the iMessage® service, several other "apps" for smart phones have also been developed that may offer more secure communication than the iMessage® platform, one such app is called GroupMe™. However, to date, all prior group messaging platforms suffer from the same undesirable features including having a login, password, sign-up requirements, the necessity for data access and clutter. Once a group message is created, any reply or comment by any member in the group is by default seen by other members of the group, thus numerous lengthy, aggravating and possibly confusing messages are allowed both vertically and horizontally within the group. For example, if the group message is created by the coach of a youth team and sent to the parents of the children on the team, this can be referred to as a vertical communication as the coach essentially serves as the "head" or "lead" of the group. With the prior art group messaging platforms, the parents are the members of the groups and if a parent chooses to respond to the initial message from the coach, then all other members including the coach see the response message (this can be thought of as horizontal communications). As above, this leads to members receiving numerous possibly unwanted messages as well, which can lead to confusion. The present invention solves this problem by only allowing vertical communications within a group message. The present invention also provides other advantages over the prior art by removing the need for internet access to communicate and does not require a user to download an "app" or create an account.

DETAILED DESCRIPTION

The present disclosure (including as shown in the attached appendix, which is incorporated herein by reference) provides a vertical group communication platform 10 and method of use that overcomes many of the shortcomings of the prior art group messaging platforms. In particular, due to the design and functionality of the platform 10, the number of messages received by group members is greatly reduced.

The platform 10 generally comprises three (3) levels of users, including a lead administrator 60, optionally other administrators 70 and members 80, in decreasing order of permissions, privileges and access within the platform.

In one embodiment, an identification number 20 (such as a phone number) is obtained by a lead administrator 60 that allows members 80 who have the provided the correct access code 30 to receive messages from the lead administrator 60 (and other administrators 70 if present) and to send messages to the lead administrator 60 (and other administrators 70 if present), but one member 80 will not receive messages sent by another group member 80.

To create a group, the lead administrator 60 obtains an identification number 20 from a home server 90 after sending a message to the home server 90 via a mechanism such as a text message. Typically, this identification number 20 is a telephone number that may be obtained or assigned from a text message gateway service 100 or is assigned in some other fashion. The identification number 20 is "assigned" as soon as the group 50 creation process has begun but is not activated until the identifying information 40 is provided (see below). The lead administrator 60 can then share this identification number 20 with other administrators 70 and members 80 of the group 50. In a preferred embodiment, the communications in the platform 10 occur via SMS messages (or texts as they will be referred to herein) over a telecommunications or other network.

To join the group, the other administrators 70 and members 80 of the group 50 will need to text the identification number 20 and provide an access code 30. The access code 30 will be an alphanumeric code that prevents unwarranted persons from joining the group 50 as without the access code 30, no one can join the group. In one preferred embodiment, two (2) access codes 30 are provided, one for administrators 70 and one for members 80. In one embodiment, the access codes 30 are assigned after certain identifying information 40 is provided by the lead administrator 60. The identifying information (concerning the group with the exception of the nickname) 40 may include, but not be limited to 40a zip code, 40b activity, 40c age, 40d gender, 40e group name, 40f nickname and 40g organization. Thus, obtaining an identification code 20 and creating a group 50 allows for members 80 with specific interests to be grouped together and receive pertinent information. Alternatively, or in addition to the above method for joining a group 50, users may join the group 50 by sending the access code 30 to the home server 90 in the same method as the lead administrator 60 did.

Once a group 50 is created, either a lead administrator 60, administrator 70 or member 80 may initiate a message. If a lead administrator 60 or administrator 70 initiate a message, all members of the group 50 will receive it. A member 80 may reply to the message and the reply message is sent only to the lead administrator 60 and administrator 70, but not to other members 80. The texts are signed by using the nickname 40f of the lead administrator 60 or other administrators 70 that was provided when the group was created (or when administrators join). By using the nickname 40f, it is clear to the group 50 which lead administrator 60 or administrator 70 sent the text. The platform 10 of the present disclosure is a vertical communications platform in that members 80 cannot send messages to one another so there is no horizontal messaging allowed. Communications and messages only flow vertically either to or from a lead administrator 60 to members 80 (or optionally an administrator 70).

In one embodiment, the platform 10 can be used to communicate to a group 50 that share a common interest or goal. For example, a coach of a youth sports team may create a group 50 to communicate with the players or player's parents about important team functions. In this example, once the sports season is over, the lead administrator 60 would dissolve the group and thus the identification number (or phone number) 20 becomes null and no one may send messages using the platform 10. Any member 80 or other administrator 70 can leave the group 50 at any time without dissolving the group 50. Alternatively, the lead administrator 60 role can be transferred to another user without dissolving the group 50.

The platform 10 of the present disclosure includes, in one embodiment, a number of servers, computers and networks. First, the home server 90 stores information needed by the platform 10 to recognize groups 50, lead administrators 60, administrators 70 and members 80. In one embodiment, the home server 90 may be a server running LINUX software and include several databases. The text message gateway service 100 receives the texts from either a lead administrator 60, an administrator 70 or a member 80 and sends it to the home server 90 along with a unique message identifier 120. Typically, the text message gateway service communicates with the home server 90 over the internet or other network 110.

In another embodiment of the platform 10 disclosed herein, the anonymity of the members 80 is removed responses to an individual message or group message may be allowed. The platform 10 however still blocks member 80 to member 80 messaging. This embodiment could be useful for intracompany communications wherein a manager (or lead administrator 60) is responsible for responding to all messages send by the members 80. As above, there may be one or more other administrators 70 (potentially an unlimited number) that can be assigned or tasked with responding to messages should the lead administrator be unavailable while retaining, optionally, the right to be copied on every message sent over the platform 10.

In yet another embodiment of the platform 10, user anonymity is maintained in that each time a user sends a message, they are assigned an arbitrary code which changes each time a message is sent. A lead administrator 60 or administrator 70 could respond to the message by entering the arbitrary code and then typing/sending the message. As above, there may be one or more other administrators 70 (whole number can be limited) that can be assigned or tasked with responding to messages should the lead administrator 60 be unavailable. In this embodiment, the lead administrator 60 can communicate directly with members 50 en masse while allowing the members 50 to retain their anonymity.

In one embodiment, creating a group 50 involves the following steps:
1. Step 1, text the letter 'c' to the home server, usually to a pre-identified phone number.
2. Step 2, respond to the text generated by Step 1—copy, paste, edit and send the template that is provided with the requested identifying information 40. Alternatively, simply text a zip code to the home server and the questions set forth in the template will be sent, one at a time, to the lead administrator 60 to be answered.
3. Step 3—The group 50 is now created and the lead administrator 60 has been sent the access code(s) 30 to share with members 80.
4. Step 4—Instruct interested members 50 to text the access code 30 to the appropriate number.

Although particular embodiments of the present disclosure have been described, it is not intended that such references be construed as limitations upon the scope of this disclosure except as set forth in the claims.

We claim:

1. A method of sending vertical SMS messages comprising:
   a) a lead administrator contacting a first server with a request to create a group and providing certain identifying information to the first server;
   b) assigning an identification number to the group;
   c) creating and assigning at least one access code to the group;
   d) sharing the access code to desired members of the group and adding members to the group that send the access code to the identification number; and
   e) sending a SMS message to members of the group from the lead administrator, wherein the SMS messages are only shared vertically within the group.

2. The method of claim 1 wherein the identification number is a phone number.

3. The method of claim 1 wherein the identifying information is at least one of zip code, activity, age, gender, group name, nickname and organization.

4. The method of claim 3 wherein the identifying information is at least three of zip code, activity, age, gender, group name, nickname and organization.

5. The method of claim 1 wherein the identifying information is at least three of zip code, activity, age, gender, group name, nickname and organization.

6. The method of claim 1 wherein a member may leave the group and the group is not dissolved.

7. The method of claim 1 wherein the vertical message sharing prevents members from sending a message to other members.

8. The method of claim 4 wherein the vertical message sharing prevents members from sending a message to other members.

9. The method of claim 1 wherein two (2) access codes are assigned to the group, wherein the first access code is an administrator code and the second access code is a member code.

10. The method of claim 9 wherein the administrator code allows messages to be sent to all members of the group.

11. The method of claim 10 wherein the member code allows messages to be sent to the administrator only.

* * * * *